(12) United States Patent
Van Der Doel

(10) Patent No.: US 10,444,390 B2
(45) Date of Patent: Oct. 15, 2019

(54) METHOD OF IDENTIFYING REFLECTED SIGNALS

(71) Applicant: Adrok Limited, Edinburgh (GB)

(72) Inventor: Cornelis Pieter Van Der Doel, West Vancouver (CA)

(73) Assignee: Adrok Limited, Edinburgh (GB)

( * ) Notice: Subject to any disclaimer, the term of this patent is extended or adjusted under 35 U.S.C. 154(b) by 338 days.

(21) Appl. No.: 15/117,289

(22) PCT Filed: Jan. 29, 2015

(86) PCT No.: PCT/GB2015/050203
§ 371 (c)(1),
(2) Date: Aug. 8, 2016

(87) PCT Pub. No.: WO2015/121614
PCT Pub. Date: Aug. 20, 2015

(65) Prior Publication Data
US 2017/0176618 A1 Jun. 22, 2017

(30) Foreign Application Priority Data
Feb. 13, 2014 (GB) .................................. 1402544.9

(51) Int. Cl.
*G01V 1/36* (2006.01)
*G01V 1/28* (2006.01)
(Continued)

(52) U.S. Cl.
CPC .............. *G01V 1/366* (2013.01); *G01V 1/362* (2013.01); *G01V 3/12* (2013.01); *G01V 3/38* (2013.01);
(Continued)

(58) Field of Classification Search
CPC ........ G01V 1/005; G01V 1/362; G01V 1/366; G01V 2210/322; G01R 31/1272
See application file for complete search history.

(56) References Cited

U.S. PATENT DOCUMENTS 3,539,985 A 11/1970 Schneider et al.
6,535,818 B1 * 3/2003 Baeten .................. G01V 1/362
702/17
(Continued)

OTHER PUBLICATIONS

Sandy Eckel, "Lecture 8: Correlation and Intro to Linear Regression" May 5, 2008, pp. 1-40. (Year: 2008).*
(Continued)

*Primary Examiner* — Mohamed Charioui
*Assistant Examiner* — Christine Y Liao
(74) *Attorney, Agent, or Firm* — Winstead PC

(57) ABSTRACT

Disclosed is a method of, and computer program and apparatus for, identifying reflected signals, subsequent to their reflection within a medium. The method comprises obtaining return signals (100), resulting from measurements being performed over a measurement period. The measurement period comprises sub-periods, the return signals comprising reflected signals and noise. The plurality of return signals are partitioned into plural sets (220) of equal cardinality or as equal as possible such that their cardinality differs by no more than one. A stacked correlation value is determined (130) for the return signals by determining the mean of the return signals across the plural sets (230) and determining a correlation value of the plural sets over each of the time sub-periods (240). Peaks in the variation of the stacked correlation value over time can then be identified and each of the peaks in the variation of the stacked correlation value over time can be attributed to a reflected signal.

26 Claims, 3 Drawing Sheets

(51) Int. Cl.
*G01V 1/00* (2006.01)
*G01V 3/38* (2006.01)
*G01V 3/12* (2006.01)

(52) U.S. Cl.
CPC ........ *G01V 1/005* (2013.01); *G01V 2210/322* (2013.01)

(56) References Cited

U.S. PATENT DOCUMENTS

| | | | | |
|---|---|---|---|---|
| 6,661,367 | B2* | 12/2003 | Sugiyama | G01S 7/2927 342/159 |
| 7,260,021 | B1* | 8/2007 | Moerig | G01V 1/375 181/111 |
| 2006/0164916 | A1* | 7/2006 | Krohn | G01V 1/005 367/41 |
| 2013/0003499 | A1 | 1/2013 | Al-Shuhail | |

OTHER PUBLICATIONS

Fernandes, Paulo, "International Search Report," prepared for PCT/GB2015/050203, dated Jun. 19, 2015, four pages.

* cited by examiner

METHOD OF IDENTIFYING REFLECTED SIGNALS

The invention relates to the field of seismic and/or radar remote sensing, in particular for the location of deep underground objects and/or structures. More specifically, the invention relates to a method of identifying reflected signals during such remote sensing operations.

Exploration for earth resources using pulsed waves are widely used in industry. Such methods are limited by the resolution of the reflections which is determined by distance and clutter and noise. A widely used method (called "stacking") is to repeat the measurement several times and to average the resulting measured return signals. In such a case the reflections will add up in the averaging, but the noise will not, resulting in higher resolution.

It is desirable to provide a method to identify reflections which are so weak that they are not apparent even after stacking thus extending the effective range of the pulsed wave method of exploration.

SUMMARY OF INVENTION

In a first aspect of the invention there is provided a method of identifying reflected signals, subsequent to their reflection within a medium, said method comprising:

obtaining a plurality of return signals, resulting from a plurality of measurements being performed over a measurement period, said measurement period comprising plural sub-periods, said return signals comprising reflected signals and noise;

partitioning the plurality of return signals into plural sets of equal cardinality or as equal as possible such that their cardinality differs by no more than one;

determining a stacked correlation value for said return signals by determining the mean of said return signals across said plural sets and determining a correlation value of the plural sets over each of said time sub-periods; and identifying peaks in the variation of said stacked correlation value over time and attributing each of said peaks in the variation of said stacked correlation value over time to a reflected signal.

Other aspects of the invention comprise a computer program comprising computer readable instructions which, when run on suitable computer apparatus, cause the computer apparatus to perform the method of the first aspect; and an apparatus specifically adapted to carry out all the steps of any of the method of the first aspect.

Other non-essential features of the invention are as claimed in the appended dependent claims.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Disclosed is a method to identify weak reflections of a wave pulse sent into a region for identifying objects and/or features. The wave pulse can be an acoustic pulse or an electromagnetic pulse. In a typical application an electromagnetic or acoustic pulse is sent into the ground from the surface and the return signal is measured at the surface. The return signal is then analysed for the presence of reflections from structures below ground, which can then be located if the (average) wave propagation velocity is known.

In some cases, the return signals are sufficiently weak that the reflections are obscured by clutter and/or noise and are not identifiable by conventional means. This typically happens when trying to explore deep regions in the earth.

Some reflections may be so weak that they are not apparent even after stacking. Such weak reflections occur from far objects and/or structures. The ability to identify them will result in a significant increase in exploration depth using the pulsed wave method.

Figure 1:
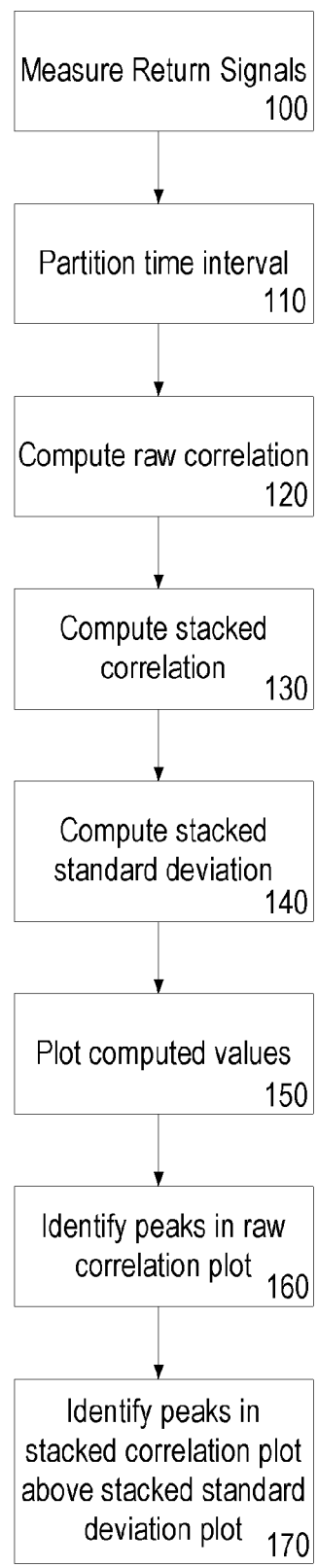
FIG. 1 is a flowchart describing a method according to an embodiment of the invention.

FIG. 1 is a flowchart describing a method according to an embodiment of the invention. The method applies to circumstances where wave pulses are repeatedly (N times, where N may take any value; for example, N may lie between 10 and 5000, or between 100 and 1000; N=500 is a typical number) sent into the medium being explored. At step 100, the return signals are measured for each pulse. These return signals and are denoted by $x_i(t)$, where $i=1, \ldots, N$ labels the specific pulse, $0 \le t \le T$ represents time, and T is the duration of the measurement. In most applications t is discretely sampled. The aim is to identify reflections which are present in all N signals, but are too faint to be directly visible by a visual inspection of a graph of $x_i(t)$.

At step 110, the time interval [0 T] is partitioned into K sub-periods. This partition may be determined by the time sequence $t_0 < t_1 < \ldots < t_{K-1} < t_K$, with $t_0 = 0$, $t_K = T$, and the other times can be chosen as appropriate. The kth sub-period is denoted by $\Delta_k = [t_{k-1}, t_k]$ where $T_k = \frac{1}{2}(t_{k-1} + t_k)$. The choice of partition is application dependent and is typically chosen to have sub-periods that are at least as large as the temporal extent of the expected reflection signal.

Following this, and for each sub-period, three parameters are computed.

At step 120, the first of these parameters is computed, which is herein called the "raw correlation". This is the mean over all distinct signal pairs $x_i(t)$, $x_j(t)$, $i \ne j$ of their correlation over the sub-period.

In general, where a correlation is calculated as part of a method disclosed herein, the correlation $C(y, z, k)$ may be calculated as follows; where $y(t)$ and $z(t)$ are the two signals being correlated over a sub-period $\Delta_k$:

$$C(y, z, k) = \frac{\int_{t_{k-1}}^{t_k} (y(t) - \langle y \rangle_k)(z(t) - \langle z \rangle_k) dt}{\sqrt{\left( \int_{t_{k-1}}^{t_k} (y(t) - \langle y \rangle_k)^2 dt \int_{\Delta_k} (z(t) - \langle z \rangle_k)^2 dt \right)}}$$

where $\langle y \rangle_k = \int_{t_{k-1}}^{t_k} y(t) dt / (t_k - t_{k-1})$ $\langle z \rangle_k = \int_{t_{k-1}}^{t_k} z(t) dt / (t_k - t_{k-1})$ It should be understood that one or more of the integrals may be replaced by a discrete approximation in standard fashion should time t be sampled discretely (as will usually be the case).

Specifically, the "raw correlation" $R_k$ may be calculated at step 120 for each time interval k ($1 \le k \le K$) as follows:

$$R_k = \sum_{i \neq j} C(x_i, x_j, k) / N(N-1)$$

Figure 2:
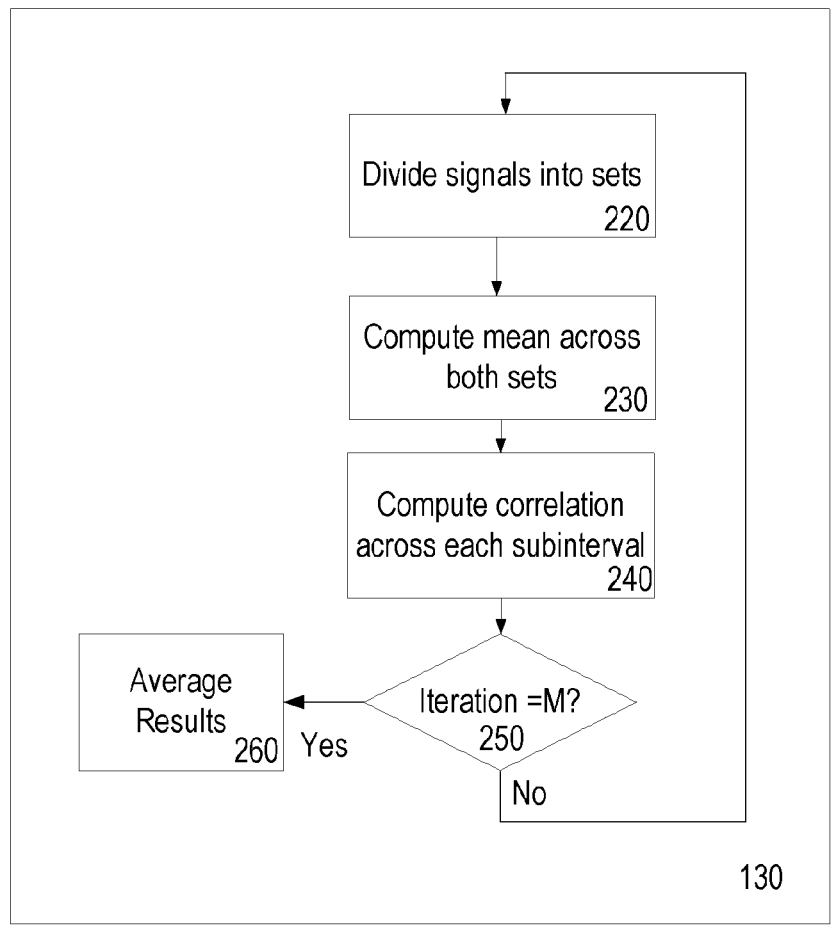
FIG. 2 is a flowchart describing in more detail a calculation step of the method of FIG. 1.

At step 130, the second of these parameters, called herein the "stacked correlation" is calculated. FIG. 2 is a flowchart expanding on the method of this step.

At step 220, the set of N signals is randomly divided into two disjoint sets of equal size N/2 if N is even, or of sizes (N+1)/2 and (N−1)/2 if N is odd. At step 230, the mean signals across both sets are computed. At step 240 their correlation across each time sub-period is computed. This procedure is repeated M times (step 250) after which the results are averaged (step 260).

More specifically, step 130 may comprise letting [IJ] denote a random partition of 1, . . . , N into two disjoint sets I and J with equal size or cardinality denoted by |I| and |J| if N is even (i.e., |I|=|J|) and with J containing one more element than I if N is odd (i.e., |J|=|I|+1). M distinct random partitions may be generated, denoted by $[I_m\ J_m]$, m=1, . . . , M. M may be any value, for example M may lie between 10 and 1000, or 10 and 500. A typical value of M is 100. "Stacked correlation" $S_k$ is defined for each time interval k (1≤k≤K) as follows:

$$S_k = \sum_{m=1}^{M} c_{mk} / M$$

where $$c_{mk} = C\left(\sum_{i \in I_m} x_i, \sum_{j \in J_m} x_j, k\right)$$

At step 140, the third parameter, called herein the "stacked standard deviation" is calculated. This comprises calculating, for each time sub-period, the standard deviation of the quantity that was averaged as described in the previous paragraph. Consequently, the "stacked standard deviation" $D_k$ for each time interval k (1≤k≤K) is defined as follows:

$$D_k = \sqrt{\sum_{m=1}^{M} (c_{mk} - S_k)^2 / (M-1)}$$

At step 150, the three parameters $R_k$, $S_k$, and $D_k$ are plotted versus the centre time $\tau_k$ of the time sub-periods. At step 160, reflections are identified by 1) peaks in the raw correlation, or 2) peaks in the stacked correlation which lie above the stacked standard deviation. It is the latter that has the ability to detect very faint reflections; the higher they lay above the stacked standard deviation the more significant they are.

Figure 3:
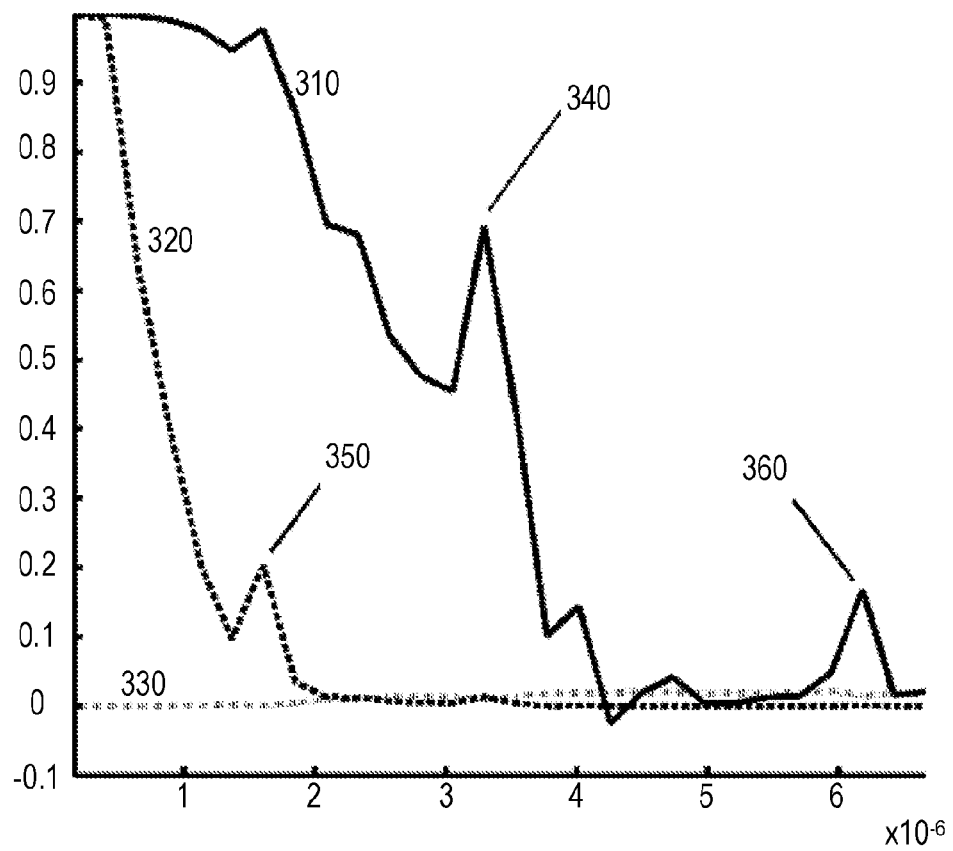
FIG. 3 is a graph showing an exemplary result of the method of FIG. 1.

FIG. 3 is a graph showing an exemplary result, based on simulated data. The horizontal axis represents time from 0 to about 6.5 μs. Plot 310 is a plot of the stacked correlation, plot 320 is a plot of the raw correlation, and plot 330 is the stacked standard deviation. A peak 350 can be seen on the raw correlation plot 320 at around t=1.8 μs, representing a strong reflection. Two peaks 340, 360, each above stacked standard deviation plot 330, can be seen on the stacked correlation plot 310 at around t=3.5 μs and t=6.2 μs. These peaks 340, 360 indicate weak reflections.

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive, optical drive or similar. Such a computer system may also comprise a display unit and one or more input/output devices.

The concepts described herein find utility in all aspects (real time or otherwise) of identification, surveillance, monitoring, optimisation and prediction of a subsurface volume. It may be used, purely by way of example, in the identification, surveillance, monitoring, optimisation and prediction of a hydrocarbon reservoir, and may aid in, and form part of, methods for extracting hydrocarbons from such hydrocarbon reservoir and well systems.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying figure shall be interpreted as illustrative and not in a limiting sense.

The invention claimed is:

1. A method of performing a remote sensing operation to locate underground objects, said method comprising:
   transmitting a wave pulse into a subsurface region;
   identifying reflected signals subsequent to their reflection from the subsurface region, the identifying comprising:
      obtaining a plurality of return signals, resulting from a plurality of measurements being performed over a measurement period, said measurement period comprising plural sub-periods, said return signals comprising reflected signals and noise, for each of the sub-periods:
      partitioning the plurality of return signals into plural sets of equal cardinality or as equal as possible such that their cardinality differs by no more than one; and
      determining a stacked correlation value for said return signals by determining a mean of said return signals across said plural sets and determining a correlation value of the plural sets over each of said time sub-periods;
   identifying peaks in the variation of said stacked correlation value over time and attributing each of said peaks in the variation of said stacked correlation value over time to a reflected signal;
   using the results to aid in identification, surveillance, monitoring, optimisation, and prediction of the subsurface region in the remote sensing operation;
   wherein said plural sets comprise first and second sets and said step of determining a stacked correlation value further comprises:
      partitioning said first and second sets randomly into plural pairs of first subsets and second subsets;
      determining a correlation value of each of said pairs of first and second subsets over each time sub-period; and
      determining the mean of said correlation values calculated in the preceding step.

2. The method as claimed in claim 1, wherein said first and second sets are partitioned into between 50 and 500 plural pairs of first subsets and second subsets.

3. The method as claimed in claim 1, wherein said first and second sets are partitioned into between 50 and 150 plural pairs of first subsets and second subsets.

4. The method as claimed in claim 1 wherein said method comprises:
determining a raw correlation value for said return signals by determining the mean of the correlation values of all distinct return signal pairs over each of said time sub-periods; and
identifying peaks in the variation of said raw correlation value over time and attributing each of said peaks in the variation of said raw correlation value over time to a reflected signal.

5. The method as claimed in claim 1 wherein when determining a correlation value, said correlation value C(y, z, k) of two signals y(t) and z(t) over a sub-period $\Delta_k$ is defined as follows:

$$C(y, z, k) = \frac{\int_{t_{k-1}}^{t_k} (y(t) - \langle y \rangle_k)(z(t) - \langle z \rangle_k) dt}{\sqrt{\left(\int_{t_{k-1}}^{t_k} (y(t) - \langle y \rangle_k)^2 dt \int_{\Delta k} (z(t) - \langle z \rangle_k)^2 dt\right)}}$$

where $\langle y \rangle_k = \int_{t_{k-1}}^{t_k} y(t) dt / (t_k - t_{k-1})$ $\langle z \rangle_k = \int_{t_{k-1}}^{t_k} z(t) dt / (t_k - t_{k-1})$.

6. The method as claimed in claim 5 wherein time t is sampled discretely and the integrals are replaced by a discrete approximation.

7. The method as claimed in claim 1 comprising the step of partitioning said measurement period into said plural sub-periods of equal length.

8. The method as claimed in claim 7 wherein said sub-periods are at least as large as the temporal extent of the expected reflected signal.

9. The method as claimed in claim 1 comprising the initial step of sending first signals into said medium so that they reflect within the medium, and measuring the return signals subsequent to reflection within said medium.

10. The method as claimed in claim 9 wherein said first signals are sent as pulses.

11. The method as claimed in claim 10 wherein said measurement period comprises between 50 and 2000 pulses.

12. A computer-program product comprising a computer-usable medium having computer-readable program code embodied therein, the computer-readable program code adapted to be executed to implement the method of claim 1.

13. A computer apparatus comprising a processor and memory, the processor and the memory in combination being specifically adapted to carry out the steps of the method as claimed in claim 1.

14. A method of performing a remote sensing operation to locate underground objects, said method comprising:
transmitting a wave pulse into a subsurface region;
identifying reflected signals subsequent to their reflection from the subsurface region, the identifying comprising:
obtaining a plurality of return signals, resulting from a plurality of measurements being performed over a measurement period, said measurement period comprising plural sub-periods, said return signals comprising reflected signals and noise, for each of the sub-periods:
partitioning the plurality of return signals into plural sets of equal cardinality or as equal as possible such that their cardinality differs by no more than one; and
determining a stacked correlation value for said return signals by determining a mean of said return signals across said plural sets and determining a correlation value of the plural sets over each of said time sub-periods;
identifying peaks in the variation of said stacked correlation value over time and attributing each of said peaks in the variation of said stacked correlation value over time to a reflected signal;
using the results to aid in identification, surveillance, monitoring, optimisation, and prediction of the subsurface region in the remote sensing operation;
determining a stacked standard deviation value for each time sub-period, by determining the standard deviation of said stacked correlation value; and
only attributing a peak in the variation of said stacked correlation value over time to a reflected signal if the value of said peak is greater than said stacked standard deviation value at the corresponding time.

15. A computer apparatus adapted to identify reflected signals, subsequent to their reflection within a medium, said computer apparatus comprising a processor and memory, the processor and the memory in combination being configured to:
obtain a plurality of return signals, resulting from a plurality of measurements being performed over a measurement period, said measurement period comprising plural sub-periods, said return signals comprising reflected signals and noise, for each of the sub-periods:
partition the plurality of return signals into plural sets of equal cardinality or as equal as possible such that their cardinality differs by no more than one; and
determine a stacked correlation value for said return signals by determining a mean of said return signals across said plural sets and determining a correlation value of the plural sets over each of said time sub-periods;
identify peaks in the variation of said stacked correlation value over time and attribute each of said peaks in the variation of said stacked correlation value over time to a reflected signal;
utilize the results to aid in identification, surveillance, monitoring, optimisation, and prediction of the subsurface region in the remote sensing operation; and
wherein said plural sets comprise first and second sets, and said computer apparatus is configured to determine a stacked correlation value by:
partitioning said first and second sets randomly into plural pairs of first subsets and second subsets;
determining a correlation value of each of said pairs of first and second subsets over each time sub-period; and
determining the mean of said correlation values calculated in the preceding step.

16. The computer apparatus as claimed in claim 15, wherein said first and second sets are partitioned into between 50 and 500 plural pairs of first subsets and second subsets.

17. The computer apparatus as claimed in claim 15, wherein said first and second sets are partitioned into between 50 and 150 plural pairs of first subsets and second subsets.

18. The computer apparatus as claimed in claim 15, being further configured to:

determine a raw correlation value for said return signals by determining the mean of the correlation values of all distinct return signal pairs over each of said time sub-periods; and identify peaks in the variation of said raw correlation value over time and attribute each of said peaks in the variation of said raw correlation value over time to a reflected signal.

19. The computer apparatus as claimed in claim 15 wherein the correlation value $C(y, z, k)$ of two signals $y(t)$ and $z(t)$ over a sub-period $\Delta_k$ is defined as follows:

$$C(y, z, k) = \frac{\int_{t_{k-1}}^{t_k} (y(t) - \langle y \rangle_k)(z(t) - \langle z \rangle_k) dt}{\sqrt{\left(\int_{t_{k-1}}^{t_k} (y(t) - \langle y \rangle_k)^2 dt \int_{\Delta_k} (z(t) - \langle z \rangle_k)^2 dt\right)}}$$

where $\langle y \rangle_k = \int_{t_{k-1}}^{t_k} y(t) dt / (t_k - t_{k-1})$ $\langle z \rangle_k = \int_{t_{k-1}}^{t_k} z(t) dt / (t_k - t_{k-1})$.

20. The computer apparatus as claimed in claim 19 wherein time t has been sampled discretely and the integrals are replaced by a discrete approximation.

21. The computer apparatus as claimed in claim 15 being configured to partition said measurement period into said plural sub-periods of equal length.

22. The computer apparatus as claimed in claim 21 wherein said sub-periods are at least as large as the temporal extent of the expected reflected signal.

23. The computer apparatus as claimed in claim 15 being configured to initially send first signals into said medium so that they reflect within the medium, and measuring the return signals subsequent to reflection within said medium.

24. The computer apparatus as claimed in claim 23 wherein said first signals are sent as pulses.

25. The computer apparatus as claimed in claim 24 wherein said measurement period comprises between 50 and 2000 pulses.

26. A computer apparatus adapted to identify reflected signals, subsequent to their reflection within a medium, said computer apparatus comprising a processor and memory, the processor and the memory in combination being configured to:

obtain a plurality of return signals, resulting from a plurality of measurements being performed over a measurement period, said measurement period comprising plural sub-periods, said return signals comprising reflected signals and noise, for each of the sub-periods:

partition the plurality of return signals into plural sets of equal cardinality or as equal as possible such that their cardinality differs by no more than one; and determine a stacked correlation value for said return signals by determining a mean of said return signals across said plural sets and determining a correlation value of the plural sets over each of said time sub-periods;

identify peaks in the variation of said stacked correlation value over time and attribute each of said peaks in the variation of said stacked correlation value over time to a reflected signal;

utilize the results to aid in identification, surveillance, monitoring, optimisation, and prediction of the subsurface region in the remote sensing operation;

determine a stacked standard deviation value for each time sub-period, by determining the standard deviation of said stacked correlation value; and only attribute a peak in the variation of said stacked correlation value over time to a reflected signal if the value of said peak is greater than said stacked standard deviation value at the corresponding time.

* * * * *